United States Patent [19]
Fickes et al.

[11] Patent Number: 5,142,538
[45] Date of Patent: Aug. 25, 1992

[54] LINK PROTOCOL FOR RS 232 COMMUNICATIONS

[75] Inventors: Stanley L. Fickes, San Jose; Bernard E. Stewart, Campbell; Robert J. Grady, Windsor; Rick L. Reagan, Santa Clara; John Piccone, San Jose; Richard C. Allen, Los Gatos, all of Calif.

[73] Assignee: Photonics Corporation, Campbell, Calif.

[21] Appl. No.: 511,333

[22] Filed: Apr. 19, 1990

[51] Int. Cl.⁵ .................. G08C 25/02; H04L 1/14
[52] U.S. Cl. .......................................... 371/34; 371/32
[58] Field of Search ............................ 371/34, 32

[56] References Cited

U.S. PATENT DOCUMENTS

| | | | |
|---|---|---|---|
| 3,402,389 | 9/1968 | Koontz | 371/34 |
| 3,605,091 | 9/1971 | Tong | 371/34 |
| 3,680,045 | 7/1972 | Meidan | 371/34 |
| 3,805,234 | 4/1974 | Masters | 371/34 |
| 3,910,322 | 10/1975 | Hardesty, Jr. et al. | 364/200 |
| 3,934,224 | 1/1976 | Dulaney et al. | 371/34 |
| 3,995,258 | 11/1976 | Barlow | 364/200 |
| 4,254,499 | 3/1981 | Yoshikane | 370/85 |
| 4,347,609 | 8/1982 | Fukuyama et al. | 371/34 |

Primary Examiner—Charles E. Atkinson
Attorney, Agent, or Firm—Limbach & Limbach

[57] ABSTRACT

An infrared RS 232 communication link protocol is particularly suited for correcting any errors introduced during a transmission of information. The information is transmitted from a transmitting station to a receiving station. Each of the stations has a control counter each of which toggles between a logic 0 and 1. The control counter for the transmitter and the receiver are phase locked so that all errors may be corrected. The receiver echoes each data bit back to the transmitter which compares the echoed data to the transmitted data. If there is a match, the transmission was successful. If there is no match, the data must be retransmitted. A retransmit control character RTXx is sent to indicate that the receiver should discard the previous character and prepare for a retransmission of the character having the error. Under the proper circumstances and if the counters are still phase locked, the receiver then discards the previously stored character and inverts the counter. If the receiver detects that it has received an erroneous character, such as one having multiple or no PPM pulses, the receiver will simply respond with the reject control character REJ. In such a case, the transmitter will respond with an RTXx which causes the receiver to discard the previously stored character and invert the counter.

7 Claims, 7 Drawing Sheets

Microfiche Appendix Included
(17 Microfiche, 1 Pages)

LINK PROTOCOL FOR RS 232 COMMUNICATIONS

A microfiche appendix is attached hereto including a single microfiche sheet having 17 frames. The microfiche incorporates a copyrighted computer program. A portion of the disclosure of the patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

The portion of the disclosure which is subject to copyright protection is a computer program. That program is a portion of the preferred embodiment of the present invention. The program may be found in a micro fiche appendix to the application.

FIELD OF THE INVENTION

This invention relates to the field of data communication. More particularly, this invention relates to a protocol for RS 232 data communication over a link which includes a method and apparatus for error correction. In the preferred embodiment, an infrared link is used.

BACKGROUND OF THE INVENTION

In U.S. patent application Ser. No. 184,261, now U.S. Pat. No. 4,977,618, issued Dec. 11, 1990, an infrared data communications link is disclosed. Data transmission over an infrared media provides the possibility for the introduction of spurious errors. One method to correct such errors particularly suitable to an Apple Talk Network is disclosed in U.S. patent application Ser. No. 331,604. APPLE TALK is a trademark of Apple Computer Corporation. In an RS 232 environment, additional conditions exist which demand alternate solutions to the data integrity problem.

SUMMARY OF THE INVENTION

The preferred embodiment of the present invention is for an infrared RS 232 communication link protocol. The protocol is particularly suited for correcting any errors introduced during transmission of information. The protocol may be useful in other types of transmission media.

The information is transmitted from a transmitting station to a receiving station. Each of the stations has a control counter/flag, each of which toggles between a logic 0 and 1. The control counter for the transmitter and the receiver are phase locked so that all errors may be corrected. The information is transmitted in nine bit 'words', including an eight bit character byte and a flag identifying special codes.

The receiver echoes each data bit back to the transmitter which compares the echoed data to the transmitted data. If there is a match, the transmission was successful. If there is no match, the data must be retransmitted. A retransmit control character (RTXx) is sent to indicate that the receiver should discard the previous character and prepare for a retransmission of the character having the error. Under the proper circumstances and if the counters are still phase locked, the receiver then discards the previously stored character and inverts the counter.

If the receiver detects that it has received an erroneous character, such as one having multiple or no pulse position modulation PPM pulses, the receiver will simply respond with the reject control character REJ. In such a case, the transmitter will respond with an RTXx which causes the receiver to discard the previously stored character and invert the counter.

BRIEF DESCRIPTION OF THE TABLES

The tables in the disclosure illustrate the transmitted data, register states and flag states within hardware systems relevant to the data flow. Each line of the tables indicates a subsequent point in time. Where the data has not changed states, the entries are left blank to avoid cluttering the tables with unnecessary information and to highlight the changes.

DETAILED DESCRIPTION OF THE PREFERRED EMBODIMENT

Figure 1:
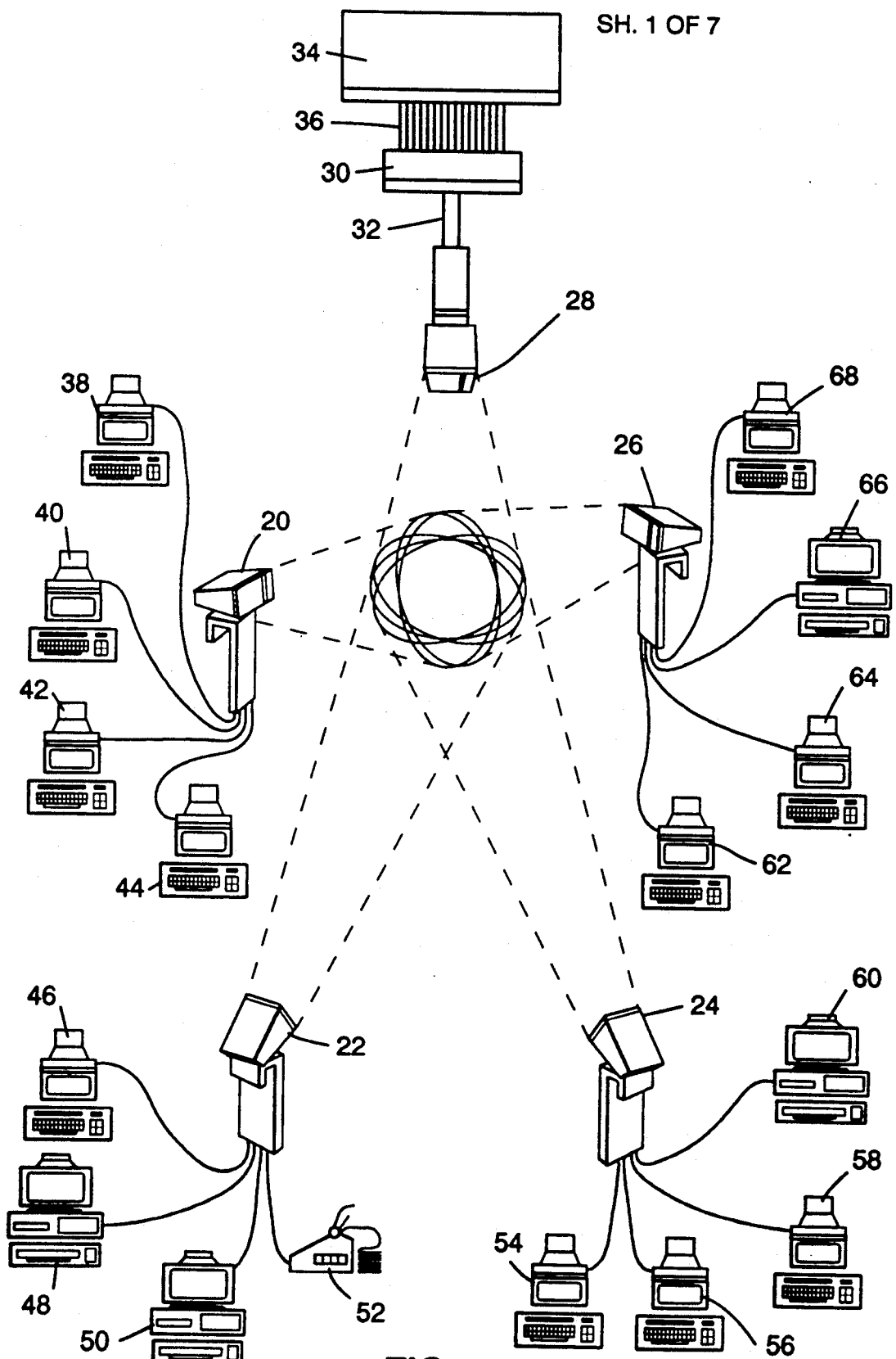
FIG. 1 shows a block diagram of a representative RS 232 system according to the present invention.

FIG. 1 shows a representative system according to the present invention. Sixteen components are connected to the network via an RS 232 port. There is a hard wire link connecting each member of a group of four elements to an infrared transceiver which operates according to U.S. patent application Ser. No. 184,261. Thus, there are sixteen components connected in groups of four to each of four infrared transceivers 20, 22, 24 and 26. A fifth infrared transceiver 28 connects the infrared network to a concentrator circuit 30 via two twisted pairs of unshielded wires 32.

In the preferred embodiment the infrared transceivers 20, 22, 24, 26 and 28 are PHOTOLINK units from Photonics Corporation. PHOTOLINK is a trademark of Photonics Corporation.

The concentrator circuit 30 is connected to a mainframe computer 34 or other host through sixteen individual channels 36. In the example of FIG. 1, PHOTOLINK 20 is connected to and services four terminals 38, 40, 42 and 44. The connection is via four PHOTOLINK parts. The PHOTOLINK 22 is connected to a terminal 46, two personal computers 48 and 50 and a line printer 52. The PHOTOLINK 24 is connected to three terminals 54, 56 and 58 and to a personal computer 60. The PHOTOLINK 26 is connected to three terminals 62, 64 and 68 and to a personal computer 66. The system configuration shown in FIG. 1 is by way of example only. The components can be any RS 232 component, including but not limited to terminals, personal computers, printers, modems, fax machines and the like.

The RS 232 network of the preferred embodiment can control up to forty separate users, sixteen of whom can each control one of the sixteen time slots for data transmission. It will be readily apparent to one having ordinary skill in the art after reviewing this disclosure that this system may be expanded to include more than forty users and/or more than sixteen channels.

Information is transmitted over the infrared transmission medium one character at a time. The transmission is synchronized and is sent using PPM. Each character is sent using two PPM nibbles. Each nibble is encoded to one of sixteen pulse positions in the PPM. In addition, each data character or control character is transmitted with a control flag bit. Pulse Position Modulation is well known.

Figure 2:
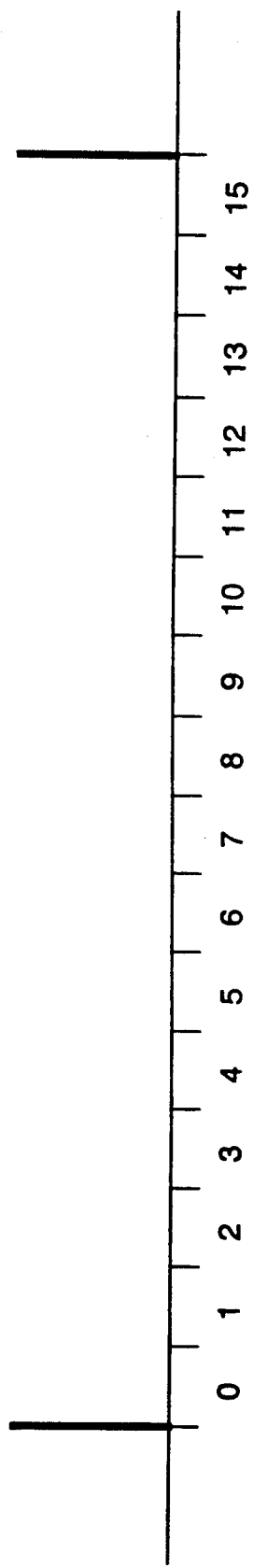
FIG. 2 shows a typical PPM cycle.
Figure 3:
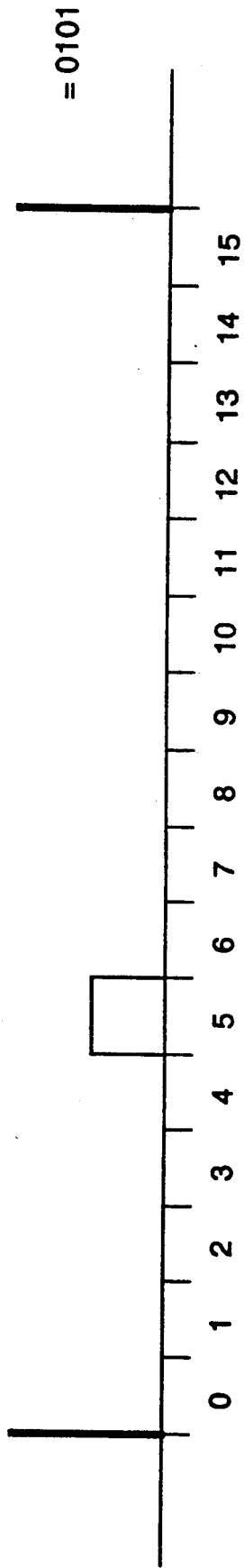
FIG. 3 shows a PPM cycle illustrating the four bit nibble for number five or binary 0101.

Each nibble is encoded into one of sixteen pulse positions. Since the selection of one of sixteen items can be represented by four binary bits the position of the pulse within one of the sixteen appropriate pulses provides information for four binary bits. FIG. 2 shows the sixteen possible pulse locations for the PPM encoding. FIG. 3 shows the four binary bits resulting from a pulse in location five. Two such sixteen pulse position transmissions provide the eight bits of a transmitted character.

In the preferred embodiment valid data characters only have one pulse per PPM slot. Control codes have two pulses in predetermined time slots. Characters with more than one pulse that are not a known control character are identified as an error. When no data is being transmitted, a NULx control character is sent. Thus, a PPM cycle with no pulses is also identified as an error.

The concentrator circuit 30 controls the flow of information in the RS 232 environment of the present invention. The information is transmitted back and forth between the concentrator and the various active components in the network.

Figure 4A:
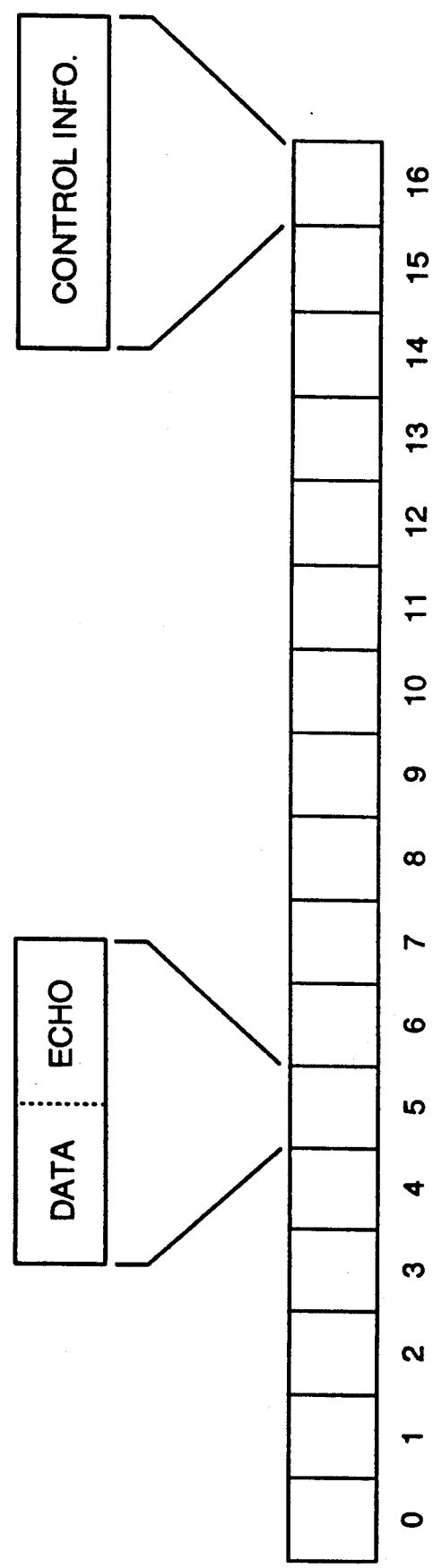
FIG. 4A shows the time slots for transmission of data in a system according to the present invention.

The information transmitted in the RS 232 network is time division multiplexed into seventeen time slots as shown in FIG. 4A. The first sixteen time slots, 0-15, are reserved for the transmission of data related to the sixteen channels 36 of FIG. 1. The seventeenth time slot is reserved for transmitting control information.

The transmission of data in the preferred embodiment is full duplex. Thus, each of the time slots is portioned to provide for a single byte of data and a single byte of echo in each direction as shown in FIG. 4A.

The channels are assigned by the concentrator to any component requesting access to the network on an as needed basis. During the seventeenth time slot, the concentrator will query each PHOTOLINK port if it requires a channel. Only one PHOTOLINK port is queried during each successive control time slot. If the user currently being interrogated responds in the affirmative, the concentrator assigns that PHOTOLINK port a channel. The PHOTOLINK port echoes the channel number. The concentrator affirms that the echo is correct and the PHOTOLINK port reaffirms.

Figure 4B:
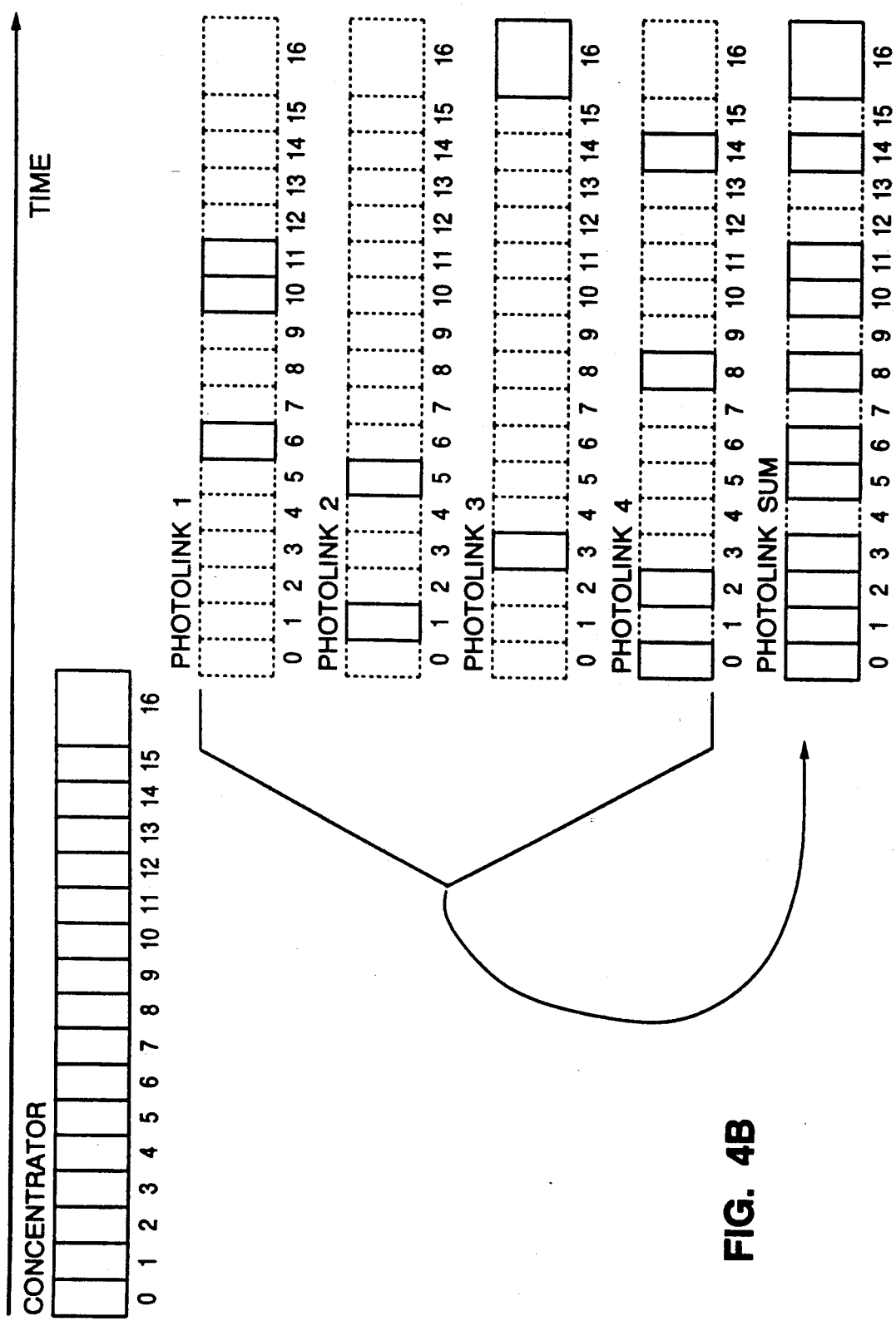
FIG. 4B shows the utilization of the time slots for transmission of data by a concentrator and four PHOTOLINKS having a representative time slot assignment.

FIG. 4B shows a representative transmission of data. The concentrator will transmit information during each of the seventeen time slots. If one of the time slots has not been assigned, or has recently been freed, the concentrator will transmit NULx. Because no PHOTOLINK is using that time slot there will be no NULx echo. Eventually, the concentrator will only transmit RTXx to indicate that the NULx are not being echoed.

As shown in FIG. 4B, PHOTOLINK 1 only has control and transmits during time slots 6, 10 and 11, PHOTOLINK 2 during time slots 1 and 5, PHOTOLINK 3 during time slots 3 and the control information time slot and PHOTOLINK 4 during time slots 0,2,8 and 14. Thus, there are transmissions during time slots 0, 1, 2, 3, 5, 6, 8, 10, 11, 14 and 16 of the PHOTOLINK portion of the transmission. There are no transmissions during time slots 4, 7, 9, 12, 13 and 15.

If a PHOTOLINK port has control of a channel and requests to be disconnected from its channel it releases that channel for other PHOTOLINK ports. In any case, if the PHOTOLINK port responds that it does not require a channel or fails to respond, the concentrator interrogates the next PHOTOLINK port during a succeeding control time slot.

For example, in the network of FIG. 1 the user of terminal 38 might be the first to request a channel and be assigned channel 0. The next user requesting a channel might be personal computer 60 which could then be assigned channel 1. Channel 2 might be assigned to terminal 46, channel 3 to terminal 44, channel 4 to terminal 64, channel 5 to personal computer 48 and so on. There is no requirement that the channels be assigned in numerical sequence and is merely done so as matter of convenience.

During the time that each of these users maintain active control of their respective channels, any information transmitted within the respective time slot will be communicated to that component and ignored by all others in the network.

If at a later time in the example considered above, the personal computer 60 no longer requires the second time slot one, it will relinquish that time slot. The remaining users continue to maintain control over their respective previously assigned time slots. The time slot previously controlled by the personal computer 60 remains inactive until such time as it is assigned to a user by the concentrator.

Any time that a user requests control of a time slot in order to transmit information, any unassigned time slot may be assigned to that user. There is no requirement that the lowest numbered unassigned time slot be assigned. Once a time slot is assigned it remains under the control of the assigned component until such time as that control is relinquished.

There are a multitude of spurious sources of infrared radiation in an open office environment including sunlight reflected through a window off a passing car or the operation of a photocopier. Also because people are moving and working in the office, an infrared beam that is bearing data can occasionally be temporarily interrupted. Thus, even though the PHOTOLINK is designed to reduce the introduction of errors, an error correction method and apparatus are included in the RS 232 system to ensure continual error free data transmission and reception.

TABLE 1

| CONCENTRATOR | PHOTOLINK |
|---|---|
| NULL → | |
| | → NULL |
| | ← NULL |
| NULL ← | |

TABLE 1-continued

| CONCENTRATOR | PHOTOLINK |
|---|---|
| A → | |
| | → A |
| | ← A |
| A ← | |
| B → | |
| | → B |
| | ← B |
| B ← | |

Table 1 shows the sequence of data transmission and reception where the sequence of the two character "AB" is sent. In the event that no information is being transmitted over an assigned channel/time slot, a null character is continually sent back and forth between the concentrator and the receiving PHOTOLINK. Each line of table 1 shows a successive event in its proper time sequence. The sequence of transmission shown in Table 1 indicates that data is transmitted from the concentrator to a PHOTOLINK. This is by way of example only.

In Table 1, the concentrator transmits a null to the PHOTOLINK which then receives a null. The PHOTOLINK echoes the null back to the concentrator which receives the null and recognizes that the transmission was successful. Next, the concentrator transmits an "A" and the PHOTOLINK receives an "A". The PHOTOLINK echoes "A" back to the concentrator which receives the echoed "A" which recognizes that the transmission of the "A" was successful. Lastly, the concentrator transmits a "B" and the PHOTOLINK receives a "B". The PHOTOLINK echoes "B" back to the concentrator which receives the echoed "B" which recognizes that the transmission of the "B" was successful.

TABLE 2A

| CONCENTRATOR | PHOTOLINK |
|---|---|
| C → | |
| | → D* |
| | ← D |
| D ← | |

TABLE 2B

| CONCENTRATOR | PHOTOLINK |
|---|---|
| C → | |
| | → C |
| | ← C |
| *D ← | |

Table 2A shows that the concentrator transmitted a "C". However, the PHOTOLINK received a "D". (Errors are shown in the table with an asterisk.) The PHOTOLINK echoes a "D" which the concentrator receives. The concentrator recognizes that an error has occurred. In Table 2B, the concentrator transmitted a "C" and the PHOTOLINK correctly received a "C". The PHOTOLINK echoes a "C" back to the concentrator which incorrectly receives a "D".

In the examples of Tables 2A and 2B, the concentrator knows that an error has occurred. It cannot determine whether the error occurred in the transmission of the data to the receiving PHOTOLINK or whether it occurred in the echo back.

There are three control characters which are used to control the flow of information and properly correct errors if they occur. These control characters are: 1) NULx, 2) RTXx 3) REJ. There is a single bit counter/flag for each transmitter and receiver which toggles back and forth between 0 and 1. The flag and its condition are indicated by the location of a double pulse within the PPM transmission of these control characters. The counters for each link should be phase locked.

Figure 5:
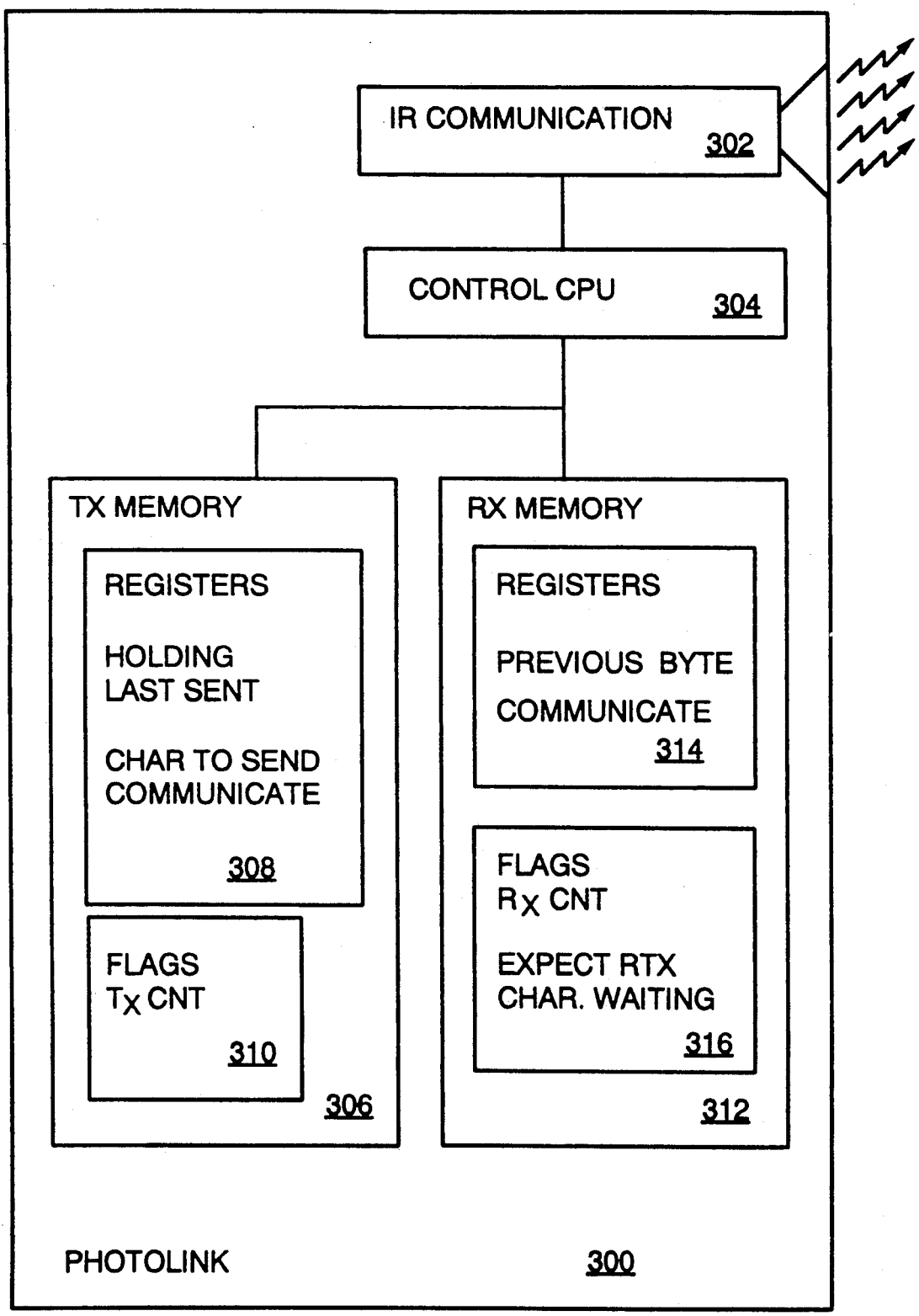
FIG. 5 shows a block diagram of a transceiver utilized according to the preferred embodiment.

FIG. 5 shows a block diagram of the construction of a PHOTOLINK 300 according to the present invention. Infrared information communication is conducted via the infrared communication block 302. A control CPU ensures proper data flow such as shown in the flow charts of FIGS. 6 and 7. Because each PHOTOLINK operates as both a transmitter and a receiver, each PHOTOLINK must be constructed to include all the transmit and receive elements. The memory can be considered as a portioned between transmit TX memory 306 containing the registers for transmitting 308 including the holding register, the last sent register, the character to send register and communicate registers containing the data to be sent out by the infrared communication block 302 or the echo received via the same infrared communication block. The transmit TX memory 306 also includes flags 310 including the T$_X$CNT.

The memory is also portioned into receiver memory RX 312. The receiver memory RX 312 includes registers 314 having a previous byte register and communicate registers for receiving data from a transmitter or echoing received data back via the IR communication block 302. The receiver RX memory 312 also includes flag 316 including the receiver control counter/flag R$_X$CNT the expect RTX flag and the character waiting flag.

TABLE 3

| T$_X$CNT | CONCENTRATOR | PHOTOLINK | R$_X$CNT |
|---|---|---|---|
| 1 | 1 | NUL 1 → | |
| 2 | | | |
| 3 | | → NUL 1 | 1 |
| 4 | 0 | ← NUL 1 | |
| 5 | | NUL 1 ← | |
| 6 | | NUL 0 → | |
| | | → NUL 0 | 0 |

Table 3 begins at a random starting point; the transmission counter T$_X$CNT in the concentrator is in the 1 state and no data is being sent so the data NUL1 is transmitted. At the PHOTOLINK, the receiver counter R$_X$CNT is toggled upon receiving data. However, upon receiving a control character NULx, it is forced to follow the control flag set in the control character NULx and thus, here goes to a 1. The PHOTOLINK echoes a NUL1 back to the concentrator. Upon receiving a successful echo the transmitter toggles its T$_X$CNT. T$_X$CNT value is loaded into the null value sent each time. Thus, in line 5 of Table 3, a NUL0 is transmitted. R$_X$CNT is toggled each time new data is received. T$_X$CNT is toggled each time there is a successful echo.

Figure 6:
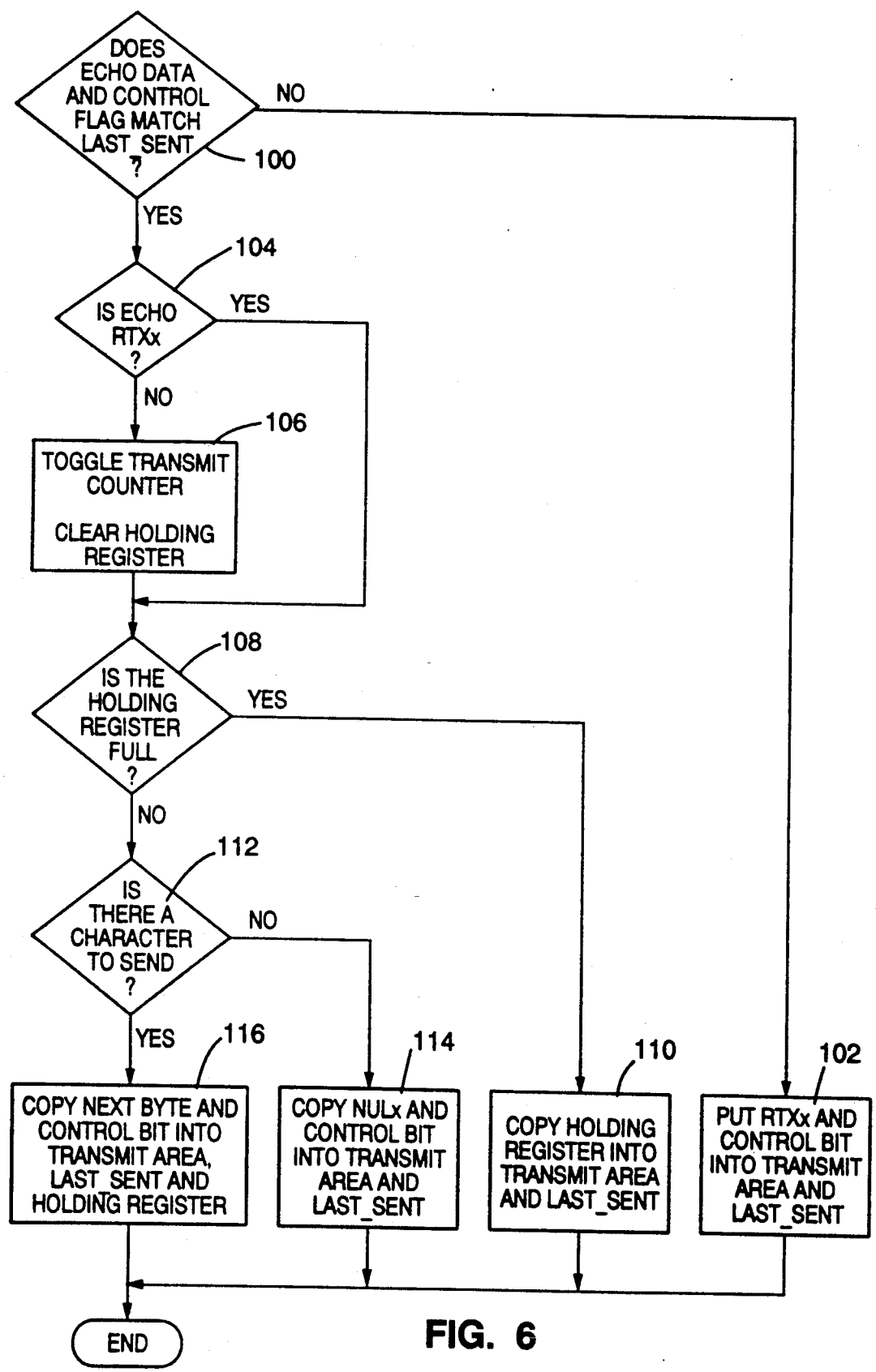
FIG. 6 shows a flow chart of operation of the transmit portion of the transceiver of the present invention.

FIG. 6 is a flow chart for the data flow in the transmit PHOTOLINK. Each byte which is transmitted from a transmit PHOTOLINK to a receive PHOTOLINK is echoed back from the receive PHOTOLINK back to the transmit PHOTOLINK. Each "word" of data which is transmitted has nine bits. Eight of the bits are transmitted according to the PPM method described above. The ninth bit identifies the eight bit byte as a control code.

As an echoed byte and control bit are received by the transmit PHOTOLINK, the transmitter compares the echoed information with the data stored in the last sent register in decision block 100 to ensure that the data and the control bit are the same. If the information does not match, the transmitter transmits the control character RTXx to the receiver to indicate that it will retransmit the previous byte to ensure a proper transmission. RTX is the retransmit control character. The lower case x is the proper control bit. RTXx is also put into the last sent register as shown in block 102.

If the data received by the transmit PHOTOLINK does match the data which was transmitted it is compared to RTXx, as shown in decision block 104. If the echo is not an RTXx, then new information was sent during the last transmit cycle and the transmit counter/control flag is toggled in block 106. The holding register is also cleared in block 106. If the echo is determined to be an RTXx in decision block 104 then block 106 is bypassed.

Next, it is determined whether the holding register is full in decision block 108. If the holding register is full, that means that the retransmit control character RTXx was received and the information in the holding register is copied into the transmit area and last sent register in block 110 to be sent again to the receive PHOTOLINK. If the holding register is not full, indicating that the retransmit control character RTXx was not received, then the transmit PHOTOLINK looks at the character to send register to see if there is a new character to send in decision block 112.

If there is no character to send then the control character NULx, including the appropriate control bit, is copied into the transmit area and last sent register to be sent to the receive PHOTOLINK in block 114. If there is a character to send the information in the character to send register and the control bit are copied into the transmit area, the last sent register and the holding register in block 116. This is the end of a transmit cycle.

Figure 7:
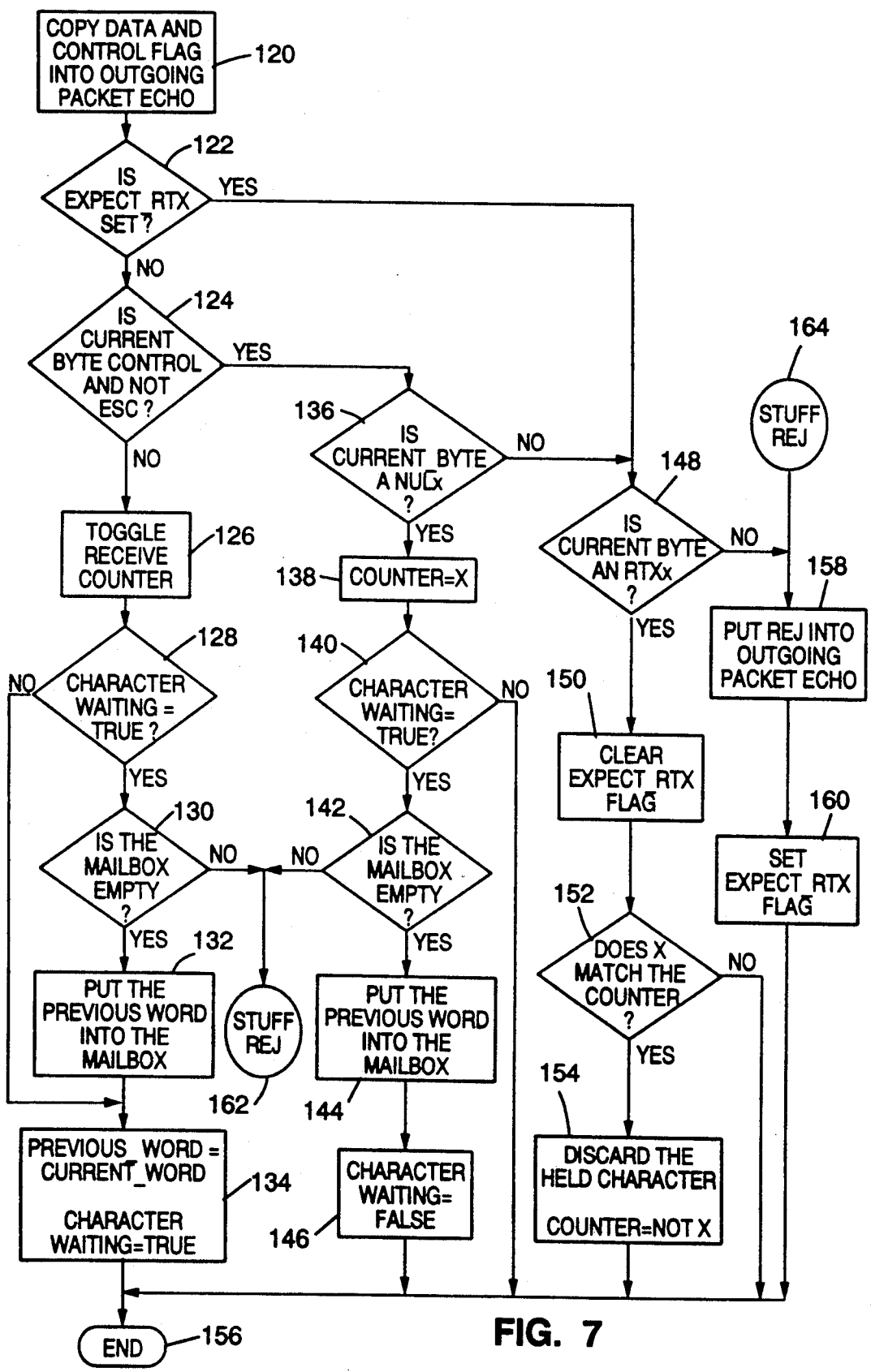
FIG. 7 shows a flow chart of the operation of the receive portion of the transceiver of the present invention.

FIG. 7 is a flow chart describing the operation of the receive PHOTOLINK. In block 120, the received data and the control flag are copied into the outgoing packet echo. During an error correction cycle, the receive PHOTOLINK will set an expect RTX flag. In decision block 122 the receive PHOTOLINK determines whether the expect RTX flag is set. If the expect RTX flag is not set then the receive PHOTOLINK determines whether the current received byte is a control character which is not ESC in decision block 124. If the current byte is data or ESC the receive counter is toggled in block 126.

In decision block 128 the receive PHOTOLINK determines whether the waiting character flag is true. If the character waiting flag is true, the receive PHOTOLINK then determines whether the mailbox is empty in decision block 130. If the mailbox is empty, the previous word is placed into the mailbox to be communicated to the appropriate component connected to the receive PHOTOLINK in block 132. The current word is placed into the previous byte register and the character waiting flag is set to true in block 134. If the character waiting flag is not true in block 128 decision block 130 and block 132 are skipped and the current word is placed into the previous byte register and the character waiting flag is set equal to true in block 134.

If the current byte is determined to be a control byte in block 124 then it is determined whether the current byte is a NUL byte with the appropriate control flag appendix. If the current byte is a NULx where x equals the control flag then the counter is set equal to x in block 138 and then it is determined whether the character waiting flag equals true in decision block 140. If the character waiting flag is equal to true the receive PHOTOLINK determines whether the mailbox is empty in decision block 142.

If the mailbox is empty, the previous work is put into the mailbox to be communicated to the appropriate component connected to the receive PHOTOLINK in block 144. Once the previous byte is put into the mailbox, the character waiting flag is set equal to false in block 146. If it is determined that the expect RTX flag is set in decision block 122, it is then determined whether the current byte is an RTXx in decision block 148. If the current byte is an RTXx then the expect RTX flag is cleared in block 150 and it is determined whether x matches the counter in decision block 152. If x matches the counter in 152 the held character in previous byte register is discarded and the counter is toggled in block 154. If x does not match the counter in decision block 152 the receive PHOTOLINK continues to end block 156.

If the expect RTX flag is not set in block 122 and the current byte is a control byte and it is not NULx than it is next determined whether the current byte is an RTXx in block 148. If the result of decision block 148 is that the current byte is not an RTXx then the reject control character REJ is put into the outgoing packet echo in block 158 and the expect RTX flag is set in block 160. The receive PHOTOLINK then proceeds to the end block 156. If the mailbox is not empty in either decision block 130 or decision block 142 then the flowchart proceeds to the stuff reject connector block 162 which is the same point as the stuff reject connector block 164 and the reject control character REJ is put into the outgoing packet echo in block 158 and the expect RTX flag is set in block 160.

TABLE 4

| | | | | NO ERROR | | | | |
|---|---|---|---|---|---|---|---|---|
| | | | | | | $R_xCNT$ | | |
| LAST | CHAR. TO | HOLD | | TRANSMIT | RECEIVE | X-RTX | PREV. | MAIL- |
| SENT | SEND | REG. | $T_xCNT$ | PL | PL | C-WAIT | BYTE | BOX |
| 1 | — | — | 0 | | | -0F | | |
| 2 | | | | NUL0 → | | | | |
| 3 | NUL0 | | | | → NUL0 | | | |
| 4 | | | | | ← NUL0 | 00F | | |
| 5 | | | | NUL0 ← | | | | |
| 6 | | | 1 | | | | | |
| 7 | | | | NUL1 → | | | | |
| 8 | NUL1 | | | | → NUL1 | | | |
| 9 | | F | | | ← NUL1 | 10F | | |
| 10 | | | | NUL1 ← | | | | |
| 11 | | | 0 | | | | | |
| 12 | | | | F → | | | | |
| 13 | F | — | F | | → F | | | |

TABLE 4-continued

| | | | | NO ERROR | | | | |
|---|---|---|---|---|---|---|---|---|
| LAST SENT | CHAR. TO SEND | HOLD REG. | T$_X$CNT | TRANSMIT PL | RECEIVE PL | R$_X$CNT X-RTX C-WAIT | PREV. BYTE | MAIL-BOX |
| 14 | | | | | ← F | 00F | F | |
| 15 | | | | ⟋ F ← | | | | |
| 16 | | — | 1 ⟋ | | | | | |
| 17 | | | | NUL1 → | | | | |
| 18 | | | | | → NUL1 | | | |
| 19 | | | | | | 10F | F | |

Table 4 shows an error free transmission of the character E. T$_X$CNT is in the 0 state in line 1. The previous condition of the three transmitter registers and the receiver register are unknown. No new data is being sent via the Transmit PL (PHOTOLINK) so the Transmit PL sends a NUL0 in line 2. NUL0 is received by the Receive PL and in loaded into the Transmit PL last sent register in line 3. In line 4, the Receive PL loads 0 into R$_X$CNT and echoes NUL0. The Transmit PL receives NUL0 in line 5 indicating a successful transmission.

Because the echo agrees with the last sent register, T$_X$CNT is toggled in line 6. Because no character to send is waiting, a null is sent again and because T$_X$CNT is 1 NUL1 is sent in line 7. The Receive PL receives a NUL1 and the last sent register is loaded with a NUL1 in line 8. In line 9, the Receive PL echoes the NUL1 and toggles R$_X$CNT into a 1 state. Also in line 9, the Transmit PL receives "F" as a character to send which is loaded into the register with that name.

In line 10, the Transmit PL correctly receives the NUL1 echo which toggles T$_X$CNT to a 0 in line 11. Because "F" is loaded in the character to send register it is sent in line 12. The sent character "F" is loaded into the holding register and the last sent register and is also received by the Receive PL in line 13. The character to send register is also cleared.

The character "F" is stored in the previous byte register in line 14 as R$_X$CNT is toggled for receiving data. Also in line 14, the character "F" is echoed. The echoed character is correctly received by the Transmit PL in line 15 which toggles T$_X$CNT to a 1 in line 16 while clearing the holding register.

Because no new character to send has been received the Transmit PL transmits a NUL1 in line 17. The NUL1 is received in line 18 which toggles R$_X$CNT to a 1 in line 19. Because no RTXx character was received and the control flag is in the proper state, the Receive PL knows that the character "F" was correctly received and it is transmitted out to the appropriate component.

TABLE 5

| | | | | *NO TOGGLE OF COUNTER WITH ERROR | | | | |
|---|---|---|---|---|---|---|---|---|
| LAST SENT | CHAR. TO SEND | HOLD REG. | T$_X$CNT | TRANSMIT PL | RECEIVE PL | R$_X$CNT X-RTX C-WAIT | PREV. BYTE | MAIL-BOX |
| 1 | — | — | 0 | | | -0F | — | |
| 2 | | | | NUL0 → | | | | |
| 3 | NUL0 | G | | | → NUL0 | | | |
| 4 | | | | | ← NUL0 | 00F | | |
| 5 | | | | NUL0 ← | | | | |
| 6 | | | 1 | | | | | |
| 7 | | | | G → | | | | |
| 8 | G | — | G | | → G | | | |
| 9 | | | | | ← G | 10F | G | |
| 10 | | H | | G ← | | | | |
| 11 | | | 0 | | | | | |
| 12 | | | | H → | | | | |
| 13 | H | — | H | | → H | | G | |
| 14 | | | | | ← H | 00F | H | |
| 15 | | | | X ← | | | | |
| 16 | | | | RT$_X$0 → | | | | |
| 17 | RT$_X$0 | | | | → RT$_X$0 | | | |
| 18 | | | | | ← RT$_X$0 | 10F | — | |
| 19 | | | | RT$_X$0 ← | | | | |
| 20 | | | | H → | | | | |

Table 5 shows the Transmit PL sending "GH". There is one error during the transmission which is corrected. The state of the three transmit registers 1) last sent, 2) character to send and 3) holding register are unknown as is the state of the receive count flag R$_X$CNT and the previous byte register in the receive PHOTOLINK. The transmit count T$_X$CNT is a 0. Since no data is in the character to send register the Transmit PL transmits a NUL 0 in line 2. In line 3 the Receive PL correctly receives the NUL 0. The Transmit PL receives G as a character to send. In line 4 the Receive PL echoes NUL 0 and loads 0 into the receive count R$_X$CNT flag. In line 5 the Transmit PL correctly receives the NUL 0 echo and so toggles the transmit count flag T$_X$CNT in line 6. In line 7 the Transmit PL transmits character G which was previously in the character to send register. In line 8 the transmitted G is also stored into the last sent register and the holding register while the character to send register is emptied. Also, the G was correctly received by the Receive PL. In line 9 the G is echoed by the Receive PL which also toggles the receive count flag R$_X$CNT and stores G into the previous byte register.

In line 10 the Transmit PL correctly receives the G echo which toggles the transmit count flag T$_X$CNT and clears the holding register in line 11. In line 10 a character to send H is also received. In line 12 the H stored in the character to send register is transmitted by the Transmit PL. In line 13 the H which was transmitted above is stored into the last sent register and the holding register while the character to send register is cleared. The H is correctly received by the Receive PL which causes the G in the previous byte register to be moved into the mailbox and thus out to the appropriate component. In line 14 the H is echoed by the Receive PL at the same time that the receive count flag $R_XCNT$ is toggled to 0 and the previous byte register is stored with the H. In line 15 the Transmit PL receives some character other than the H. Accordingly, the echo which is received in line 15 does not compare to the data stored in the last sent register. For this reason, the transmit count flag $T_XCNT$ is not toggled and remains a 1. The Transmit PL sends a retransmit control character RTX0 to the Receive PL because the transmit count flag $T_XCNT$ is still in the 0 state. In line 17 RTX0 is stored into the last sent register. It is also received by the Receive PL. In line 18 the Receive PL echoes RTX0, toggles the receive count flag $R_XCNT$ to a 1 and clears the previous byte register. In line 19 the Transmit PL correctly receives the echoed RTX0. Accordingly, the Transmit PL now knows that the Receive PL realizes it has an error in its most recent reception of information. In line 20 the character H, which is still in the holding register, is transmitted again by the Transmit PL.

TABLE 6

| | CHAR. | | | | | $R_XCNT$ | | |
|---|---|---|---|---|---|---|---|---|
| LAST SENT | TO SEND | HOLD REG. | $T_XCNT$ | TRANSMIT PL | RECEIVE PL | X-RTX C-WAIT | PREV. BYTE | MAIL-BOX |
| *GARBAGE RECEIVED: MULTIPLE PULSES OR NO PULSES | | | | | | | | |
| 1 | K | — | | NUL0 ← | | 00F | | |
| 2 | | | 1 | K → | | | | |
| 3 | K | — | K | | | | | |
| 4 | | | | | ← REJ | 01F | | |
| 5 | | | | *REJ ← | | | | |
| 6 | | | | $RT_X1$ → | | | | |
| 7 | $RT_X1$ | | | | → $RT_X1$ | | | |
| 8 | | | | | ← $RT_X1$ | 10F | | |
| 9 | | | | $RT_X1$ ← | | | | |
| 10 | | | | K → | | | | |

Table 6 shows another type of error correction according to the flow charts of FIGS. 6 and 7. In line 1 of table 6 the Transmit PL correctly receives an echoed NUL0 which clears the holding register. There is a K in the character to send register. The receive count flag in the Receive PL is in a 0 state. This toggles the transmit count flag $T_XCNT$ to a 1 in line 2. Also, in line 2 the K from the character to send register is transmitted by the Transmit PL. In line 3 the K is loaded into the last sent register and the holding register while the character to send register is cleared. The Receive PL receives a character having multiple pulses or no pulses which is not an expected control character or escape. Accordingly, the expect RTX flag is set and the REJ is sent back to the Transmit PL. The Transmit PL correctly receives the REJ in line 5. The transmit counter flag $T_XCNT$ is not toggled because the echo does not match the character sent. RTX1 is transmitted by the Transmit PL in line 6. In line 7 RTX1 is received by the Receive PL which clears the expect RTX flag and toggles the receive count flag $R_XCNT$ because the receive count flag does not match the flag in the received control character in line 8. The RTX1 is also echoed back to the Transmit PL in line 8. In line 9 the RTX1 is correctly received by the Transmit PL which causes the Transmit PL to retransmit the character K from the holding register. While these few tables do not show all of the possible scenarios for receiving and correcting data it should be apparent to one of ordinary skill in the art how the flow charts of FIGS. 6 and 7 are used to correct other types of errors.

It will be understood that the data transmission over each channel and time slot is a full duplex transmission. This means that information can be traveling in each direction. In the case of the network according to FIG. 1, the concentrator 30 might be sending information to terminal 48 while the terminal is 'simultaneously' sending information back to the concentrator 30. Each time slot includes a transmission byte and an echo byte. If the concentrator is sending an "AB" to the terminal while the terminal is sending "YZ" to the concentrator, the flow of information will be as shown in Table 7.

TABLE 7

| | CONCENTRATOR | | TERMINAL | |
|---|---|---|---|---|
| | DATA | ECHO | DATA | ECHO |
| 1 | A | | | |
| 2 | | Q → | ← Y | A |
| 3 | B | Y → | | |
| 4 | | | ← Z | B |
| 5 | Q | Z → | | |

In Table 7, the concentrator is arbitrarily selected to send first. In line 1, the concentrator sends an A and an unknown echo Q back to the terminal. In line 2, the terminal sends a Y and echoes the A. In line 3, the concentrator sends a B and echoes the Y. In line 4, the terminal sends a Z and echoes the B. In line 5, the concentrator sends its unknown next character Q and echoes the Z. Because tables such as 5 and 6 would be excessively complicated if full duplex communication was shown, only communication in one direction was considered there.

While the present invention is described relative to a preferred embodiment, it will be apparent that changes and modifications which become apparent to one of ordinary skill in the art only after reading this disclosure are deemed within the spirit and scope of the present invention.

What is claimed is:

1. A communication link comprising:
   a. a transmitter including:
      (1) a transmit controller;
      (2) a transmit control counter electronically coupled to the transmit controller having a first binary state flag; and
      (3) means for transmitting a transmit character of information including the first binary state flag over a transmission channel, the means for transmitting coupled to be controlled by the transmit controller;
b. A receiver for receiving the transmit character comprising:
  (1) a receive controller;
  (2) a receive control counter having a second binary state flag electronically coupled to the receive controller;
  (3) means for forming a received character from the transmit character electronically coupled to the receive controller; and
  (4) means for echoing the received character from the receiver to the transmitter over the transmission channel coupled to be controlled by the receive controller; and
c. first phase lock means in the transmitter coupled to the transmit controller and second phase lock means in the receiver coupled to the receive controller for phase locking the first and second binary state flags with each successful transmission by comparing the state of the first and second phase lock means.

2. The link according to claim 1 further comprising:
a. means for comparing the received character to the transmit character, the means for comparing coupled to the transmit controller;
b. means for determining that an error has occurred when the received character does not equal the transmit character coupled to operate under control of the transmit controller;
c. transmitter means for communicating that an error has occurred coupled to operate under control of the transmit controller.

3. The link according to claim 2 further comprising means for correcting the error by retransmitting the transmit character coupled to operate under control of the transmit controller.

4. The link according to claim 1 wherein:
a. the transmit controller is a control CPU and the transmitter further includes:
  (2) a holding register coupled to the transmit controller;
  (3) a last sent register coupled to the transmit controller;
  (4) a character to send register coupled to the transmit controller; and
  (5) a first communicate register coupled to the transmit controller; and
b. the receiver further includes:
  (1) a previous byte register coupled to the receive controller;
  (2) a second communicate register coupled to the receive controller;
  (3) an expect RTX flag coupled to the receive controller; and
  (4) a character waiting flag coupled to the receive controller.

5. A protocol for an infrared RS232 communication link comprising:
a. transmitting a first control counter value having a first binary state flag from a transmitter over a transmission channel;
b. transmitting a transmit character of information including the first binary state flag over the transmission channel;
c. receiving the transmit character at a receiver having a second control counter value having a second binary state flag;
d. forming a received character from the transmit character;
e. echoing the received character from the receiver to the transmitter over the transmission channel; and
f. phase locking the first and second binary state flags with each successful transmission.

6. The method according to claim 5 further comprising:
a. comparing the received character to the transmit character in the transmitter;
b. determining that an error has occurred when the received character does not equal the transmit character;
c. communicating to the receiver that an error has occurred.

7. The method according to claim 6 further comprising correcting the error by retransmitting the transmit character.

* * * * *